United States Patent Office 3,576,659
Patented Apr. 27, 1971

3,576,659
DUAL COATING PROCESS
Salvatore J. Oliveri, Belleville, and David E. Hartman, Hillside, N.J., assignors to The Vorac Company, Rutherford, N.J.
No Drawing. Filed Dec. 13, 1967, Ser. No. 690,102
Int. Cl. C03c 17/32; B44d 1/10
U.S. Cl. 117—37                                                              5 Claims

ABSTRACT OF THE DISCLOSURE

Metal surfaces are coated in one area with a coating composition that is a mixture of an epoxide resin, an ether of a methylated 2,4,6-tri-methylol phenol, and 0.5 to 5.0% butylated melamine formaldehyde, and in a second area contiguous with the first aera with alkyd-butylated amino resin composition. The coated surfaces are baked at about 450° F. for about 15 minutes.,

---

This invention concerns an improved process for applying a dual coating to metal surfaces as well as the coated articles produced by such process.

More particularly, this invention relates to a simplified, efficient, and economical process for applying a dual protective coating to metal containers and the coated containers resulting from this process.

In the metal container field it is often necessary to coat the interior of such containers to protect them from deterioration due to abrasion, or attack by corrosive chemicals, and other harsh contents, as well as to prevent the contamination of the contents by their reaction with the metal of the container.

In order to alleviate such problems the industry for a considerable period of time has coated at least the interior of steel containers exposed to such adverse conditions with the well known epoxy resin type formulations.

Coatings of epoxy resin formulations after baking at elevated temperature of 400°–500° F. for 10–30 minutes, dry to tough, hard but flexible corrosion resistant protective finishes which greatly increase the durability and utility of steel containers.

While such resin coatings achieve the desired end of enhancing durability and resistance to corrosion they are relatively expensive and also have limitations in their appearance.

Because of these limitations, attempts have been made to utilize a combination of coatings for such containers i.e. to coat the interior which is exposed to the extreme conditions with an epoxy-phenolic combination coating mixture and to coat the exterior portions with a less expensive coating but one which has better aesthetic qualities although not as corrosion resistant and tough as the interior epoxy-phenolic coating. One approach has been an attempt to employ an alkyd-butoxy amino coating to the exteriors.

This approach to a suitable combination or dual coating has not proven very successful thus far due to the diverse nature of these coatings. While each coating is satisfactory for its particular intended purpose i.e. interior and exterior, at some point on the surface of the container these two distinctly different types of coatings must of neecssity be contiguous. Because of the exigencies of application techniques this is commonly at the rim of the container. There is often a considerable overlap of one type of coating with the other caused by overspray. At the junction of the two coatings, separation, fisheyes, ad other defects apparently due to the incompatibility of the two systems frequently occur which render the end product completely unsatisfactory for its intended use. This has been true no matter which coating was applied first; if the first applied was baked separately or simultaneously, and baked together.

The improved process of this invention overcomes these problems through a modification of the epoxy-phenolic resin composition which unexpectedly makes the diverse coating compositions compatible for use in the dual coating system.

The type of epoxy-phenolic resin system employed in the process of this invention for the interior coating is one containing a resinous polyepoxide derived from dihydric phenol and an epoxide. The polyepoxides have terminal aliphatic epoxide groups and are free of reactive groups other than epoxide and aliphatic hydroxyl groups. They may be represented by the formula $$R-(O-R_1-O-R_2)_x-O-R_1-O-R$$

wherein R is a terminal aliphatic radical containing a terminal epoxide group: $R_1$ is the residue of a dihydric phenol; $R_2$ is an aliphatic radical containing at least one aliphatic hydroxyl group, and $x$ designates the degree of polymerization. Such resins are available under the trade name "Epon" of the Shell Chemical Corporation: for example, Epon 1007 melting at 127°–133° C. and having an epoxide equivalent of 1600–1900; and Epon 1009 melting at 145°–155° C. and having an epoxide eequivalent of 2400–3000 are especially suitable. Such resins have the following structure:

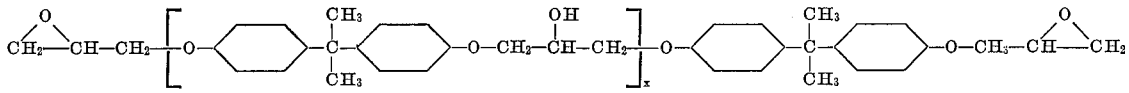

The interior coating composition also contains a particular type of phenolic resin. The phenolic resin included in the resin coating system for the interior of the containers is an ether of the formula

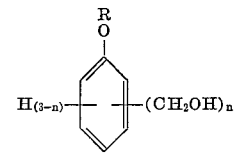

wherein $n$ has a value of 1 to 3 and R is an alkenyl preferably allyl or an aralkyl radical, preferably benzyl; and at lest approximately 50% of the methylol groups present are methylated.

The proportion of epoxide resin to the phenolic resin is from about 25 parts to about 100 parts epoxide resin to from about 100 parts to about 25 parts of the phenolic resin. Besides the principal resins the composition may contain solvents, coloring agents, and other conventional additives, as well as curing catalysts such as phosphoric acid, urea formaldehydes and other catalysts commonly used.

The outer alkyd-butoxy amino type coating composition is well known to the art. A typical composition and one that is preferred comprises from about 5 to about 20 parts of an alkyd resin based on the esterification of a polyhydric alcohol and a polybasic acid such as derived from soya oil to about one part of a butoxy-amino compound such as a butylated urea formaldehyde with at least about 20% butylation. Examples of commercially available forms of the foregoing are Amalite 4450X (American Alkyd) and Beckamine P626–50 (Reichhold Chemicals, Inc.), respectively.

Prior attempts to coat the interiors of steel containers with a composition of the foregoing epoxy-phenolic type and at the same time, the exterior with the alkyd-butoxy amino type coating have all met with failure. Because of the overlap of the different coatings due to overspray, and the like, depending on the particular application technique employed, the area of the surface covered to varying degrees with both coatings was relatively substantial. Such overlap area was plagued with poor adhesion, chipping, fisheyeing, etc., due apparently to some detrimental interaction between the different coating compositions.

These past difficulties are overcome by the present invention. It has now become possible to produce metal containers coated on the interior with the epoxy-phenolic composition and on the exterior with the alkyd-butoxy amino composition which do not have any of the foregoing defects in the area where the two compositions overlap. It has unexpectedly been found that the addition of from about 0.5% to about 5%, preferably from about 1% to about 2%, by weight, of butylated melamine formaldehyde based on the total weight of the epoxy-phenolic resin system to that system eliminates the problems encountered in the efforts of the prior art to successfully utilize the combination of interior and exterior coating compositions mentioned. The melamine formaldehyde should be at least 25% butylated and preferably from 40%–60%, although a higher degree is not harmful. An example of a commercially available produce is Resimene 882 (Monsanto Chemical Co.) which is 40%–45% butylated. The incorporation of the butylated melamine formaldehyde into the epoxy-phenolic resin composition somehow prevents the unfavorable effect which the two diverse types of coating compositions have on one another when they come in contact with each other. Exactly how the additive butylated melamine formaldehyde achieves the surprising results is not known, but extremely smooth, tough, continuous coatings are obtained by this invention with no unfavorable effects apparent in the area of transition from the area of a surface coated with the epoxy-phenolic composition to the area of the surface coated with the alkyd-butoxy amino composition. This remarkable improvement is specific to the additive of butylated melamine formaldehyde. Closely related compounds such as butylated urea formaldehyde do not achieve the desired results.

In applying the coating combination of this invention either coating composition may be applied first or they may be applied simultaneously. It is preferred, however, to apply the alkyd-butoxy amino coating first and then the epoxy-phenolic coating. The dual coated article is then baked at about 400°–475° F. for about 10 to about 30 minutes.

The following examples describing certain representative embodiments of this invention will serve to further illustrate the nature of the invention. It is to be understood that the examples are merely illustrative and intended to enable those skilled in the art to practice the invention in all of the embodiments flowing therefrom and do not in any way limit the scope of the invention defined in the claims.

EXAMPLE 1

(A) On a three roll mill a paste is made by grinding the following:

| | Lbs. |
|---|---|
| Butanol | 54.75 |
| Cellosolve acetate | 161.23 |
| Naphtha | 101.49 |
| Benzyl ether of methylated 2,4,6-tri-methylol phenol (Varcum 1281B) Reichhold Chem., Inc. (65% solids in methyl isobutyl ketone) | 39.45 |
| Titanium dioxide pigment | 234.44 |
| Epoxide Resin (Epon 1007) | 111.62 |

The mixture of the above is then blended with an additional 98.50 lbs. of Varcum 1281B (65%), 12.10 lbs. of butylated (40%–45%) melamine formaldehyde (Resimine 882), and 1 lb. triethylamine.

In a separate container 3.40 lbs. of phosphoric acid (85%) are blended with 2.76 lbs. butyl Cellosolve. The acid solution is then added to a separated blended solution of 98.81 lbs. of Epon 1007, 47.44 methyl ethyl ketone, and 3.16 lbs. of methyl isobutyl ketone and the combined solution aged for 24–48 hours.

After aging, the solutions are mixed together prior to the coating operation.

(B) The following are ground on a three roll mill; titanium dioxide 125.58 lbs., carbon block 2.75 lbs., Amalite 4450X alkyd resin 86.31 lbs. and xylol 26.47 lbs. The resultant blend is added to a solution of Amalite 4450X 3337.19 lbs., butylated urea formaldehyde (Beckamine P626–50 Reichhold Chemicals, Inc.) 25% butylation 56.88 lbs., naphtha 70.15 lbs., and toluol 151.68 lbs.

Steel drums are then spray coated on the interior with the solution of A and on the exterior with the solution of B. At the open ends of the drums there is an area of overlap of the coatings A and B. Following the spraying of the exterior and interior of the drums they are baked at 450° F. for 15 minutes. Smooth continuous coatings without visible flaws are obtained even at the area where the interior and exterior coatings overlap each other.

EXAMPLE 2

The procedure of Example 1 is followed except that in an equivalent amount of the methylated allyl ether of 2,4,6-tris (hydroxy methyl) phenol is substituted for the benzyl ether.

Similar highly satisfactory results are obtained.

EXAMPLE 3

The procedure of Example 1 is repeated, varying the composition in A from a ratio of a total of 100 parts epoxide resin per 25 parts phenolic resin to a ratio of 100 parts phenolic resin to 25 parts epoxide resin. In each instance smooth continuous coatings are obtained possessing a high degree of toughness and adherence.

While the invention has been explained by a detailed description of certain specific embodiments, it is understood that various modifications and substitutions can be made in any of them within the scope of the appended claims which are intended also to include equivalents of such embodiments.

What is claimed is:

1. A process of applying a dual coating to a metal surface comprising: applying a first coating composition comprising a mixture of from about 25 parts to about 100 parts of an epoxide resin and from about 100 parts to 25 parts of an alkenyl or aralkyl ether of a methylated 2,4,6-tri-methylol phenol and from about 0.5% to 5.0% by weight, based on the total weight of the epoxide and ether, of a butylated melamine formaldehyde to a first area of said surface; and applying a second coating composition comprising an alkyd-butylated amino resin composition to a second area of said surface, which second area is contiguous with said first area of said surface.

2. A process as claimed in claim 1 wherein said ether is the benzyl ether of 2,4,6-tri-methylol phenol which is methylated with about 2 methyl groups.

3. A process as claimed in claim 2 wherein said butylated melamine formaldehyde is from about 1% to about 2% by weight of the epoxide and ether.

4. A process as claimed in claim 1 which includes the step of baking the coated metal surface.

5. A process as claimed in claim 2 which comprises baking the coated metal surface.

References Cited

UNITED STATES PATENTS

| 3,291,856 | 12/1966 | Tringali | 117—132BE |
| 2,876,135 | 3/1959 | Levine | 117—75 |
| 2,816,084 | 12/1957 | Nowacki | 117—132BE |

ALFRED L. LEAVITT, Primary Examiner

M. F. ESPOSITO, Assistant Examiner

U.S. Cl. X.R.

117—97, 132, 161